Dec. 7, 1926. 1,609,758
J. H. MacMAHON
PROCESS AND APPARATUS FOR PREPARING BLEACH LIQUORS
Filed Dec. 24, 1924
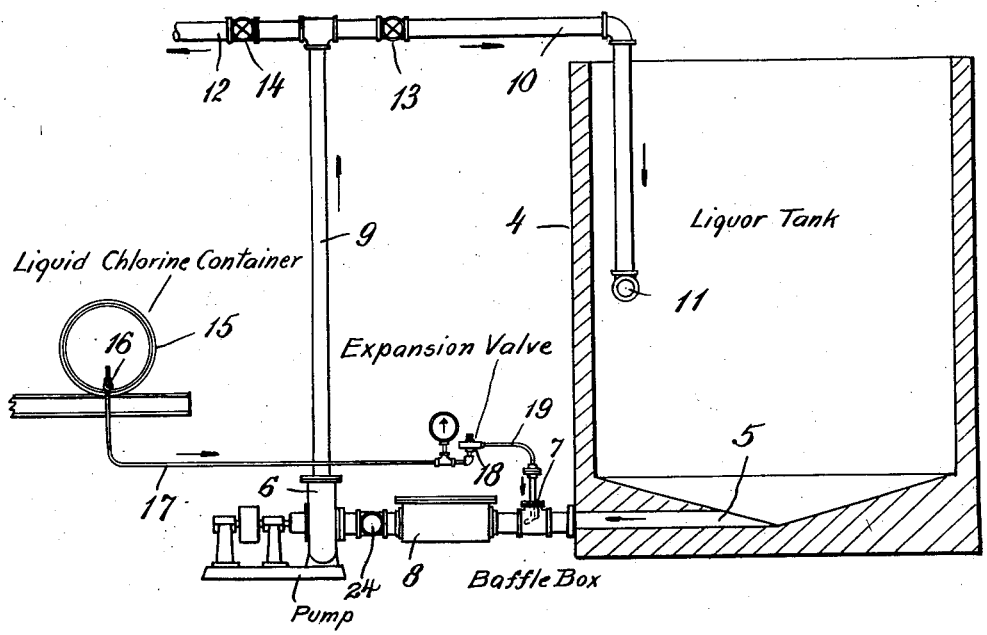
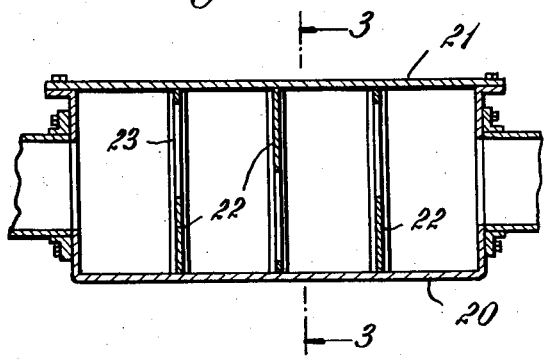 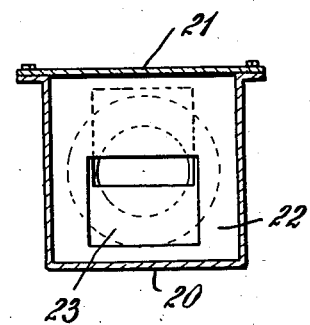
INVENTOR
James H. MacMahon Patented Dec. 7, 1926.

1,609,758

UNITED STATES PATENT OFFICE.

JAMES H. MacMAHON, OF NIAGARA FALLS, NEW YORK, ASSIGNOR TO THE MATHIESON ALKALI WORKS, OF NEW YORK, N. Y., A CORPORATION OF VIRGINIA.

PROCESS AND APPARATUS FOR PREPARING BLEACH LIQUORS.

Application filed December 24, 1924. Serial No. 757,810.

This invention relates to improvements in the preparation of liquor bleach solutions. The present invention provides an improved method and apparatus for making liquid bleach solutions from milk of lime, or other alkaline solutions, and liquid chlorine supplied from containers which contain the liquid chlorine under a high pressure.

In an application filed January 23, 1924, Serial No. 688,027 there is described an improved method and apparatus for preparing bleach liquors in which the alkaline solution to be chlorinated is circulated through a circulating line by means of a pump and in which the chlorine, while still in a liquid state, or while still a considerable part of the chlorine remains liquid, is introduced directly into the solution entering the pump, so that the pump serves as an agitating means for effectively disseminating and distributing the chlorine throughout the alkaline solution and so that the unvaporized chlorine is evaporated by direct heat exchange with the alkaline solution and the heat of reaction of the absorption of the chlorine in the solution is neutralized to an important extent by the cooling effect due to the vaporation and expansion of the liquid chlorine. The present invention is a further improvement upon the method and apparatus described in this prior application.

According to the present invention, the milk of lime, or other alkaline solution to be chlorinated, is circulated through a pump and a circulating line, and chlorine from the liquid chlorine containers, where it is under high pressure, is passed through an expansion valve and, after reduction of the pressure in the expansion valve, is introduced directly into the alkaline solution circulating to the pump in such a manner as to be substantially completely vaporized before it enters the pump. In the pump, the unabsorbed gaseous chlorine is intimately distributed and disseminated throughout the alkaline solution and the chlorination is substantially completed in the circulating line beyond the pump.

When the liquid chlorine, which is maintained under a high pressure in the liquid chlorine container, is passed through a pressure reducing or expansion valve, some of the chlorine is vaporized because of the reduction in pressure, but a considerable part of the chlorine is cooled and remains in a liquid state at a much lower temperature, approximately the boiling point of chlorine at atmospheric pressure or at the pressure to which the chlorine is reduced by the expansion valve. The latent heat of vaporization of that part of the chlorine which is vaporized is made available in the cold expanded chlorine. With the liquid chlorine and the vaporized chlorine at such a low temperature, the direct introduction of the chlorine into the alkaline solution neutralizes the heat of reaction to an important extent and this cooling effect is supplemented by the evaporation in the alkaline solution of the chlorine which is introduced as a liquid. The heat of reaction of the absorption of the chlorine in the alkaline solution also is thus employed to promote rapid evaporation of the liquid chlorine and consequent rapid chlorination of the alkaline solution into which the chlorine is introduced. By introducing the chlorine after expansion directly into the circulating alkaline solution, the cooling effect of the expansion and of the evaporation of the liquid chlorine at the lower pressure is made available in the circulating line where the heat of reaction is generated; and, by vaporizing all of the chlorine before the unabsorbed chlorine and admixed alkaline solution enter the circulating pump, the distribution of the chlorine throughout the alkaline solution in the pump is promoted and the absorption of the chlorine in the alkaline solution is improved. By effecting substantially complete vaporization of the chlorine before it enters the pump, any strains on the pump due to vaporization and expansion of the chlorine therein are also avoided.

In one way of carrying out the present invention, a baffle box is arranged in the circulating line on the suction side of the pump between the pump and the point of introduction of the chlorine. The circulation of the alkaline solution through the baffle box vigorously agitates the solution and admixes the chlorine therewith, and the vaporization of the liquid chlorine by heat exchange with the alkaline solution, which is promoted by the agitation, further assists the agitation in the baffle box. The baffle box advantageously may be arranged to trap the unvaporized chlorine and prevent any substantial amount of liquid chlorine from reaching the pump. Any small amounts of unvaporized chlorine which may enter the pump are vaporized and absorbed either in the pump or in the circulating line beyond the pump. The pump distributes the vaporized chlorine through the alkaline solution and promotes the absorption of the vaporized chlorine in the alkaline solution.

In one particular advantageous way of carrying out the present invention, the alkaline solution to be chlorinated is circulated from a tank successively through a baffle box and a circulating pump and back to the tank through a return circulating line, and the chlorine is introduced into the circulating alkaline solution entering the baffle box. The evaporation of the chlorine is substantially completed in the baffle box and the pump intimately distributes the unabsorbed vaporized chlorine throughout the circulating solution. The absorption is substantially completed in the return circulating line to the tank. The alkaline solution in the tank is thus progressively and gradually chlorinated.

The chlorination may also be effected as a once-through operation instead of with recirculation and progressive and gradual chlorination of the alkaline solution. In this way of carrying out the invention, the alkaline solution may be circulated successively through a baffle box and a pump and the chlorine introduced into the circulating solution before it enters the baffle box. The pump may be arranged to discharge the alkaline solution and any unabsorbed chlorine through a circulating line prolonged sufficiently to allow for substantially complete absorption of the chlorine, or through a circulating line into a body of the chlorinated solution in the tank.

An improved apparatus embodying the invention and adapted for the practice of the process of the invention is illustrated in a somewhat conventional and diagrammatic manner in the accompanying drawing.

In the accompanying drawing:

Fig. 1 represents in elevation and partly in section an apparatus embodying the invention and adapted for carrying out the invention.

Fig. 2 is an enlarged sectional view of the baffle box illustrated in Fig. 1, and Fig. 3 is a section on line 3—3 of Fig. 2.

In the apparatus illustrated, the mixing tank 4 has an inclined bottom and an outlet pipe 5 leading to the suction side of a pump 6 through an injection chamber 7 and a baffle box 8. The pump 6 is arranged to discharge through the pipes 9 and 10 into the mixing tank through the outlet fitting 11. A valve 24 is placed in the pipe line between the baffle box 8 and the pump 6 so that if it becomes necessary to take the pump apart for any purpose, the flow of solution in the tank 4 may be cut off. A separate discharge pipe 12 is provided through which the liquor in the mixing tank can be pumped by means of the pump 6 by closing valve 13 and opening valve 14. In the operation of the apparatus to produce bleach liquor by progressive chlorination of liquor recirculated to the tank, the valve 14 is closed and the valve 13 is opened.

The liquid chlorine is supplied from the container 15, which, for example, may be a drum of one ton capacity, and is drawn off through the valve 16 at the bottom of the container so that vaporization of the chlorine and drawing off of gaseous chlorine from the top of the container is avoided. The liquid chlorine passes through the pipe 17 to the expansion valve 18, where its pressure is reduced, and then through the expansion connection 19 directly into the liquor circulating through the injection chamber 7. The rate of flow of the liquid chlorine is regulated by the expansion valve 18, and the flow of liquor through the pipes 5, 9, and 10 is controlled by regulation of the valves therein, or regulation of the operation of the pump.

From the injection chamber 7 the admixed chlorine and circulating alkaline solution are discharged into the baffle box 8. As illustrated more in detail in Figs. 2 and 3, this baffle box consists of a rectangular casing 20 having a removable cover 21 and having a series of baffles 22 arranged therein. The baffles illustrated consist of rectangular plates supported in slots in the sides of the casing 20 and having offset rectangular openings 23 therethrough. The circulation of the liquor through the baffle box and through the baffles therein causes vigorous agitation of the liquor and promotes the distribution of the chlorine therethrough and the vaporization of the unvaporized chlorine, and the alternate baffles arranged as illustrated, tend to trap unvaporized chlorine in the lower part of the baffle box where it is rapidly vaporized by heat exchange with the circulating liquor, the vaporization of the chlorine in the baffle box further promoting the agitation therein. The chlorine is thus vaporized and admixed with the circulating alkaline solution in the baffle box 8, and part of the chlorine may be absorbed therein, and the alkaline solution and unabsorbed chlorine are further intimately admixed in the pump and the absorption of the chlorine is substantially completed in the circulating line beyond the pump.

In one way of operating the apparatus illustrated, a part of the alkaline solution with which the tank 4 is charged is continuously drawn off from one point of the body, chlorine is then introduced into the solution withdrawn and substantially completely vaporized by vigorous agitation and admixture therewith in the baffle box 8, and the absorption of chlorine in the alkaline solution is further promoted and the circulation of the alkaline solution is maintained by the pump 6 through which the admixed chlorine and alkaline solution from the baffle box 8 passes, and from which the alkaline solution and absorbed and admixed chlorine is returned to another point in the tank 4 through the return circulating line made up of pipes 9 and 10. The agitation in the baffle box 8 is effected by the circulation of the liquor which circulation is maintained by the pump 6. The solution in the mixing tank 4 is thus progressively and gradually chlorinated.

In carrying out the process of the invention in this way to produce bleach liquor from milk of lime and liquor chlorine in the apparatus illustrated, for example, the milk of lime is introduced into the mixing tank 4, which may for example have a capacity of about 12,000 gals., and liquid chlorine from a one ton container 15 is introduced in regulated amount through the expansion valve 18. The valve 14 is closed and the valve 13 is opened and the pump 6 is maintained in operation. The flow of chlorine is regulated so that the chlorination is substantially completed in the return circulating line to the mixing tank. The pressure in the liquid chlorine container may, for example, be in the neighborhood of 80 lbs. per sq. in. and the pressure may be reduced to about 5 lbs. per sq. in. or slightly above atmospheric pressure at the expansion valve 18. The milk of lime is withdrawn from the mixing tank 4 through the pipe 5 and after introduction of the chlorine enters the baffle box 8 where it is subjected to vigorous agitation and where vaporization of the chlorine is substantially completed. The milk of lime and admixed unabsorbed chlorine are then drawn into the pump where they are intimately admixed by the pump. The absorption proceeds rapidly in the pump and is substantially completed in the pipes 9 and 10 through which the liquor is returned from the pump 6 to the mixing tank 4. This circulation is continued until the desired amount of chlorine has been introduced and until the milk of lime has been chlorinated to the desired degree. When the milk of lime has been chlorinated to the desired degree, as determined by tests or by the introduction of a predetermined amount of chlorine into a predetermined amount of milk of lime, the chlorine supply is cut off and the liquor is discharged from the mixing tank 4 to a setting tank (not shown) for the separation of the clear chlorinated liquor from undissolved lime.

In another way of operating the apparatus illustrated, alkaline solution is withdrawn from the tank 4 through the baffle box 8 to the pump 6, chlorine is introduced into the solution withdrawn from the tank and is substantially completely vaporized by vigorous agitation therewith in the baffle box, and the solution and any unabsorbed chlorine are discharged from the pump through the circulating line beyond the pump made up of pipes 9 and 12, in which the absorption is substantially completed.

While the invention has been described more particularly in connection with the production of bleach liquors by the chlorination of milk of lime, it is of more or less general application to the chlorination of solutions of alkaline substances.

I claim:

1. The method of chlorinating alkaline solutions which comprises maintaining a body of the alkaline solution, withdrawing chlorine from a supply of liquid chlorine under pressure and reducing the pressure thereon, withdrawing solution from the said body and introducing the chlorine directly into the withdrawn solution after pressure reduction, vigorously agitating the admixed chlorine and solution, whereby substantially to complete vaporization of the chlorine, and pumping the alkaline solution and the admixed vaporized chlorine and the absorbed chlorine through a closed passage back to the said body.

2. The method of chlorinating alkaline solutions which comprises maintaining a body of the alkaline solution, circulating the solution from the said body through a circulating pump and back to the said body, supplying liquid chlorine to the solution circulating to the pump and effecting substantially complete vaporization of the chlorine before the admixed chlorine and solution enter the pump by vigorous agitation thereof.

3. The method of chlorinating alkaline solutions which comprises maintaining a body of the alkaline solution, circulating the solution from the said body through a circulating pump and back to the said body, withdrawing chlorine from a supply of liquid chlorine under pressure and reducing the pressure on the withdrawn chlorine, introducing the chlorine after pressure reduction into the solution circulating from the said body to the pump and vigorously agitating the circulating solution before it enters the pump.

4. The method of chlorinating alkaline solutions which comprises circulating the solution to be chlorinated through a circulating pump, supplying liquid chlorine directly to the stream of solution circulating to the pump and effecting substantially complete vaporization of the chlorine before the admixed solution and chlorine enter the pump by vigorously agitating the admixed chlorine and solution on their way to the pump.

5. The method of chlorinating alkaline solutions which comprises circulating the solution to be chlorinated through a circulating pump, withdrawing chlorine from a supply of liquid chlorine under pressure and reducing the pressure thereon; introducing the chlorine after pressure reduction into the stream of solution circulating to the pump and effecting substantially complete vaporization of the chlorine before the admixed solution and chlorine enter the pump by vigorously agitating the admixed chlorine and solution on their way to the pump.

6. The method of chlorinating alkaline solutions which comprises circulating the solution to be chlorinated to a circulating pump, supplying liquid chlorine directly to the stream of solution circulating to the pump, vigorously agitating the solution circulating to the pump substantially completely to vaporize the chlorine before the admixed chlorine and solution enter the pump, and preventing the circulation of unvaporized chlorine into the pump.

7. The method of chlorinating alkaline solutions which comprises maintaining a body of the alkaline solution, circulating the solution from the said body through a circulating pump and back to the said body; supplying liquid chlorine to the solution circulating to the pump, vigorously agitating the solution circulating to the pump substantially completely to vaporize the chlorine before the admixed chlorine and solution enter the pump, and preventing the circulation of unvaporized chlorine into the pump.

8. An apparatus for chlorinating solutions comprising means for circulating a stream of the solution to be chlorinated, said means including a circulating pump, means for introducing liquid chlorine directly into the circulating solution on the suction side of the pump, and means arranged between the pump and the means for introducing liquid chlorine for vigorously agitating the solution and introduced chlorine.

9. An appartus for chlorinating solutions comprising a tank for the solution, a circulating line including a pump for withdrawing the solution from the tank and returning it thereto, means for introducing liquid chlorine directly into the solution circulating from the tank to the pump, and means arranged between the last said means and the pump for vigorously agitating the solution and introduced chlorine.

10. An apparatus for chlorinating solutions comprising means for circulating the solution to be chlorinated through a pump, means for introducing liquid chlorine directly into the solution circulating to the pump, and means arranged between the last said means and the pump for agitating the solution and introduced chlorine and for preventing entry of unvaporized chlorine into the pump.

11. An apparatus for chlorinating solutions comprising means for circulating a stream of the solution to be chlorinated, said means including a circulating pump, means including an expansion valve for introducing chlorine directly into the circulating solution on the suction side of the pump, and means arranged between the pump and the means for introducing chlorine for vigorously agitating the solution and introduced chlorine.

In testimony whereof I affix my signature.

JAMES H. MacMAHON.